July 19, 1927.

A. OBERMOSER

BAND SAW

Filed Jan. 13, 1925

1,636,484

A. Obermoser
INVENTOR
By: Marks & Clark
Attys

Patented July 19, 1927.

1,636,484

UNITED STATES PATENT OFFICE.

ALBERT OBERMOSER, OF BRUCHSAL, GERMANY.

BAND SAW.

Application filed January 13, 1925, Serial No. 2,212, and in Germany January 15, 1924.

My invention relates to band saws and especially to the means for tensioning and ensuring the correct travel of the saw blade. Hitherto the driving motors and the driving pulleys of band saws have been fixed relatively to the frame, the putting under tension of the saw blade being effected by vertical adjustment in a slot formed in the saw frame of the shaft of the upper pulley for the saw blade, said adjustment being effected by means of a screw. As the saw works at a high velocity vibration and breakage of the saw can easily take place, with this construction.

In order to prevent the saw from slipping off the pulleys, the upper pulley is or the axle bearings thereof are sometimes inclined by the insertion of washers and by clamping with the aid of a screw, but accurate adjustment is difficult.

The present invention has for its object to overcome these drawbacks and with this object in view, the invention consists in hinging the driving motor on the saw frame in such a manner that the motor together with the driving pulley on the motor shaft hangs in the saw blade, thereby putting the same under tension by its weight. If the upper pulley is adjusted vertically, a greater or lesser inclination is given to the motor and the driving pulley. In this manner the inclination of the two pulleys one to another is automatically ensured, the motor being inclined in a plane through the axes of the shafts of the pulleys.

The other features of the invention will be described with reference to the accompanying drawing in which an embodiment of the invention is shown, by way of example.

Figure 1:
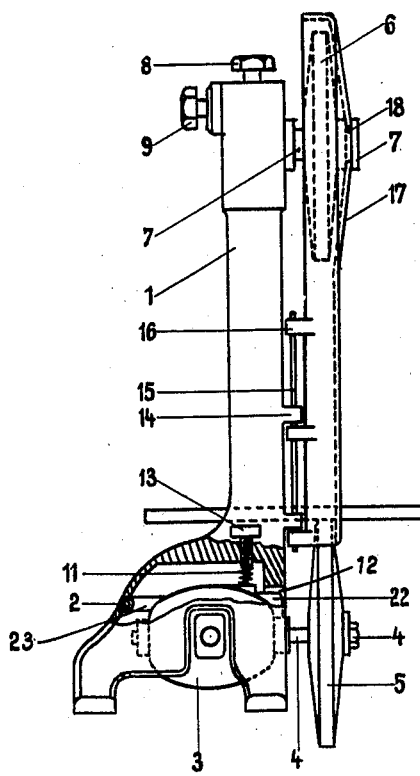
Figure 2:
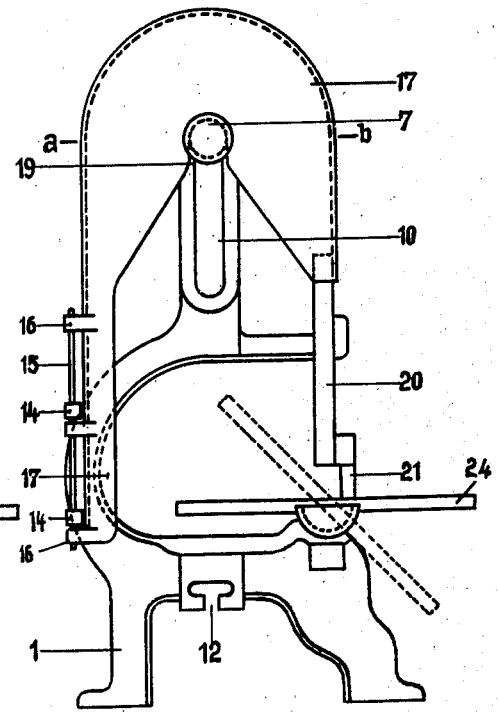
Figure 3:
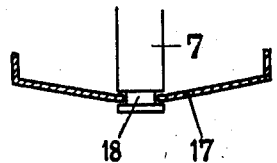

In the drawing:
Figure 1 is a side elevation and
Figure 2 a front elevation of the band saw,
Figure 3 is a section through the saw-guard taken along a—b in Figure 2.

Referring to the drawing, the motor 3 is hinged to the saw frame 1 by means of a pivot pin 2 which is fixed in the base of the saw frame and passed through arms or lugs 23 provided on the motor; preferably two lugs 23 being provided, one on each side of the motor so that the motor can oscillate only in a vertical plane but not tilt laterally. A guide slot 12 is provided in the frame, the motor having a corresponding guiding dog 22 for the purpose of further preventing lateral tilting of the motor. The driving pulley 5 is keyed on the motor shaft 4. The shaft bearing of the upper pulley 6 is mounted, in the usual manner, in a vertical slot 10 provided in the frame 1 so that it can be adjusted vertically and secured in position by means of screws 8 and 9. The pulley 5 hangs in the saw blade which consequently is put under tension by the weight of the motor 3 and of the pulley 5 as these members tend to swing downwardly about the pivot pin 2. A spring 11, the force of which can be regulated by means of a screw 13, serves to further regulate the tension of the saw blade. By screwing the screw downwards, the spring 11 is stressed and the motor 3 is pressed downwards. Consequently the saw blade is tensioned.

If the shaft 7 of the upper pulley 6 is vertically adjusted by means of the screw 8 the shaft 4 and pulley 5 of the driving motor 3 take up an inclined position. The inclination of the pulley 5 is regulated in this manner by adjusting the inclination of the motor 3, its shaft 4 and the pulley 5 so that the saw blade moves on the middle of the rim of the pulleys 5 and 6 and does not slip off the same. As soon as the desired inclination of the motor 3, of its shaft 4 and of the pulley 5 has been obtained with the aid of the screw 8, the clamping screw 9 is tightened. It is therefore no longer necessary to insert washers or the like and the tension of the saw blade is regulated, not by inclining the upper pulley 6 but by inclining the lower pulley 5.

On the frame 1 of the band saw lugs 14 are cast through which a long guide pin 15 is passed which also passes through the lugs 16 of the door-like protecting cover 17. Owing to this arrangement the door-like protecting cover can be raised or lowered with respect to the frame. The door-like cover surrounds the upper part of the front edge and also the two sides of the saw blade so that the blade is completely protected. The door-like protecting cover is cap-shaped. The protecting cover rests upon the shaft 7 of the upper band saw pulley 6, an annular groove 18 being cut in the said shaft in front of the pulley 6, the part 19 of the protecting cover 17, engaging with this annular groove so that the protecting cover cannot be displaced in the direction of the axis of shaft 7. The bearing of the shaft is adjustably mounted in the vertical slot 10 of the saw frame. As the protecting cover 17 rests upon shaft 7 and as its hinge pin 15 can move freely in the lugs 14, the door participates in any vertical movement of the shaft 7 of the upper pulley 6 and the distance between the cover 17 and the saw blade remains always the same. Owing to this arrangement, the band saw is always covered even when the upper pulley 6 is being adjusted vertically and during the adjustment of the pulley the workman does not require to pay special attention to the cover since it moves together with the pulley and the saw blade. If the door-like protecting cover 17 has to be turned aside to uncover the saw blade it must first be lifted out of engagement with the annular groove 18.

The door-like protecting cover 17 is arranged in such a manner that it covers entirely the small saw guard 20 which is adapted to be turned around a pin 21 but only after the protecting cover 17 has been raised and turned aside. The pin 21 is mounted on the table 24 of the band saw.

I claim:

1. A band saw comprising the combination with the saw frame of a driving motor having a shaft on which the saw driving pulley is mounted, said motor being hinged to said saw frame so that it hangs together with the pulley in the band saw, an upper pulley adjustably mounted in a slot of the frame so as to be capable of adjustment in the vertical direction, for regulating the inclination of the motor and driving pulley with respect to the horizontal plane, a spring and an adjusting screw for said spring arranged between said saw frame and said motor for increasing the load on the saw blade for tensioning the same.

2. A band saw comprising the combination with the saw frame, of a driving motor having a shaft on which the saw driving pulley is mounted, said motor being hinged to said saw frame so that it hangs together with the pulley in the band saw, an upper pulley adjustably mounted in a slot of the frame so as to be capable of adjustment in the vertical direction for regulating the inclination of the motor and driving pulley with respect to the horizontal plane, a guide surface on the saw frame and a guide surface on said motor for guiding the motor in the plane traversing the axes of the pulley shafts and preventing lateral tilting of said motor.

In testimony whereof I affix my signature.

ALBERT OBERMOSER.